Patented May 3, 1927.

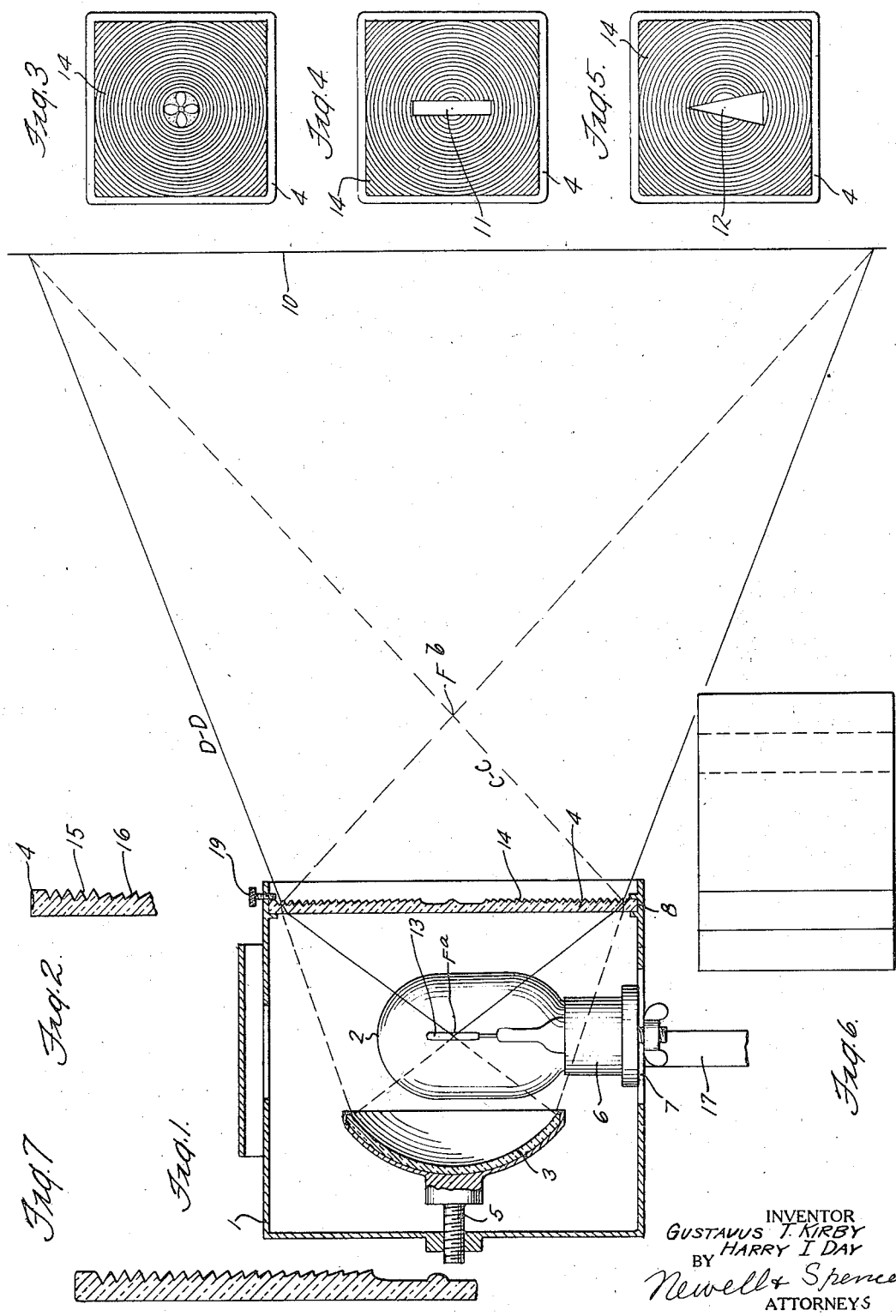

1,626,615

UNITED STATES PATENT OFFICE.

GUSTAVUS T. KIRBY, OF NEW YORK, AND HARRY I. DAY, OF FOREST HILLS, NEW YORK, ASSIGNORS, BY MESNE ASSIGNMENTS, TO KIRBY INCORPORATED, A CORPORATION OF NEW YORK.

ILLUMINATING MEANS.

Application filed January 16, 1926. Serial No. 81,738.

This invention relates to projectors and projector lighting.

The ordinary types of projectors are open to numerous objections as light sources. In the first place, the light utilization is frequently very poor, as but a relatively small solid angle of the spherical radiation of the light source is available. Projectors also produce disagreeable glare and harsh shadows. It is an object of the present invention to produce a uniform even field of light from projectors, with a very small amount of glare in comparison with the strength of illumination, and with the utilization of a very large solid angle of spherical radiation from each light source, without producing undesired color fringes.

With these and other objects in view, the present invention comprises projectors in which a source of light, a reflector, and a converging lens, preferably a prismatic converging lens, are used. The lens and reflector are substantially coaxial, and the light source is placed on the axis of the lens between the focus or focal plane of the lens and the lens itself, whereby the lens intercepts a relatively large solid angle of light, and produces from the direct radiation, a divergent beam of light. The reflector is so arranged with respect to the light source that the beam of reflected light strikes the converging lens in such a way as to form, after passing therethrough, a convergent beam, converging at a sharper angle than the divergent beam from the direct radiation of the light source. This convergent beam, after passing through a focus or focal plane, diverges at the same angle, which is steeper than that of the divergent beam from the direct radiation, and, therefore, unites with said beam in a plane at a finite distance from the lens. In this plane, the illumination is substantially uniform, provided that the whole of the lens, or, at least, a major part of the lens, has the same focal length.

In the preferred embodiment of the invention, a prismatic plate is used as a converging lens, and this type of lens presents the important advantage that it is capable of handling a very large solid angle of light, without production of color fringes, and without undue loss of efficiency. For most purposes, a flat prismatic plate is preferable, but where an extremely large solid angle of direct radiation is to be intercepted, the plate may be curved or may be provided with slanting edges.

The source of light may be an arc, an incandescent lamp, or any other suitable source. Preferably an incandescent lamp, with a monoplane filament parallel to the prismatic plate, is used, as this results in a maximum utilization of light, since most of the radiation of the monoplane filament is in a direction normal to the plane of the filament, and comparatively little is radiated from the edges. As the only portion of the solid angle of light not intercepted by lens or reflector consists, for the most part, of the light radiated by the edge of the filament, the loss is minimized.

As the field illuminated is large and even, shadows thrown by objects illuminated are not multiple, but are single, with soft edges. By arranging projectors in rows, the fields can be made to overlap. When the overlapping is horizontal, the vertical shadows cast by any object will be multiple, whereas the horizontal shadows will be single. This defines sharp horizontal lines, and is of considerable importance in many lighting devices where it is desired to emphasize horizontal lines. Vertical rows in a similar manner produce multiple horizontal shadows and single vertical shadows, and by tilting the rows, any combination of the two effects can be obtained.

Projectors of the present invention are useful generally for all purposes of flood lighting, and are particularly important for photography, both still and motion picture. The great efficiency permits the use of relatively small power, incandescent bulbs, and it is possible, with a five hundred (500) watt lamp, to produce satisfactory indoor motion pictures, which has hitherto required a much greater candle power light source, which cannot be handled by the ordinary houselighting fuses.

The well defined shadows, both vertical and horizontal, of a single projector, are sometimes undesirable for still photography, where artistic portraits, and particularly profiles, are desired. In order to soften the facial lines, while retaining the great lighting efficiency of the present invention, the prismatic lens may be modified by providing it with openings or with zones of nonuniform refracting glass, so as to light small portions of the field with a non-uniform light. Thus, it is possible, for example, to define sharp profile lines by suitable zones of non-uniform illumination. Similar effects can be produced by arranging some of the prismatic rings with a different focus from the remainder, or by using a plurality of light sources in different focus, such as, for example, an incandescent lamp with staggered filaments. Non-uniform reflectors may also be used for the same purpose.

The invention will be described in greater detail in connection with the drawings in which:—

Figure 1 is a cross section through a projector, using an incandescent lamp with a monoplane filament, and indicating the path of the beams;

Figure 2 is an enlarged detail of a lens showing prisms of non-uniform focus;

Figure 3 is a plan view of the prismatic lens shown in Figure 1;

Figures 4 and 5 are plan views of modified prismatic lenses, having openings of various shapes;

Figure 6 is a diagrammatic representation of the light effect produced by a series of projectors arranged in a horizontal row; and Figure 7 is an enlarged view of part of the lens plate shown in Figure 1.

The projector consists of a projector box 1, preferably of metal, provided with suitable ventilating means and mounted on a support 17. An incandescent lamp 2, having a monoplane filament 13, is mounted in a movable base 6 which can be slid backwards and forwards in a slot 7. A spherical reflector 3 is attached to the rear wall of the projector and is adjustable by means of the screw 5. The front of the projector is open and provided with a channel 8 along its lower edge. A prismatic lens 4, having circular prisms 14, fits in the channel 8 and is fastened at the top by the fastening screw 9.

The light source 13 is placed between the prismatic lens and its focus and the reflector 3 is adjusted until it is suitably out of focus with the light source. The light source and reflector axis, of course, coincide with the optical axis of the lens and the monoplane filament 13 is arranged so that the flat planes face fore and aft.

The focal points of the lens are shown, respectively, at $F^a$ and $F^b$. Since the light source is out of focus, the rays form the divergent beam D—D after passing through the prismatic plate. These direct rays are shown in full lines in Figure 1. The light rays from the rear plane of the filament strike the mirror 3, and are reflected in the form of a divergent beam, since the light source is not in focus with the reflector. The reflected light rays, striking the prismatic lens, form a convergent beam C—C which converges to a focal plane $F^b$ and thereupon diverges at an angle considerably greater than that of the divergent beam D—D. The two beams meet in the plane 10, which is accordingly brilliantly illuminated with the full strength of the two projected beams and shows a substantially uniform illumination. The size of the illuminated field and its distance from the projector are determined by the angle of the divergent beam D—D and by the focal length of the prismatic lens which determines the angle of the beam C—C. With any given prismatic lens, therefore, the size and distance of the illuminated field 10 is determined by the position of the light source with respect to the focus of the prismatic lens, which position determines the angle of the beam D—D.

Figures 4 and 5 show modified prismatic lenses having openings 11 and 12 of various shapes. When these modified lenses are used, the direct radiation from the front of the filament produces a divergent beam through the opening of an angle which usually does not coincide with that of the beam D—D and, in case of larger openings, a parallel reflected beam from the mirror may also be present. Obviously, these two beams will cause a non-uniform illumination in the portions of the field which they strike and by suitable shapes and sizes, any combination of multiple shadows can be effected so as to bring about the desired lighting effects. In the case of apertures, particularly those not in the center of the lens, a beam passing through the opening may be largely a parallel beam from the mirror and produce a bright spot or a bright ring, in the case of an annular opening in the field. Such a restricted bright area is sometimes desirable for certain photographic effects in motion picture photography where it is desired to emphasize certain small areas of a scene. Innumerable combinations of openings are, of course, possible, and are included in the present invention, and it should be clearly understood that Figures 4 and 5 are merely illustrations of two possible types of openings. Obviously, instead of providing an actual opening, the glass in the corresponding portion of the lens may be plain glass.

In Figure 2, part of the angular rings 15 have one focus, and a smaller number 16 have a different focus. The rings 16 will, therefore, produce a narrow circular band of uneven illumination on the field, which is otherwise illuminated evenly.

It should be noted that when prismatic plates are used as converging lenses, an observer, looking at the projector from an angle, sees only the thin ridges of the prismatic rings as bright spots. As the area of these apices is very small, compared to the whole area of the plate, the glare is reduced tremendously. It will also be noticed that the light which strikes any portion of the field consists in two components coming from opposite sides of the prismatic plate, so that an observer situated in the field of illumination and looking at the plate never sees more than half the light. This fifty percent (50%) reduction in glare, added to the great reduction, due to the prismatic construction, renders the projector particularly suitable for photographic purposes, and avoids the serious troubles which are produced by glaring projectors in motion picture photography, and which have frequently resulted in serious injury to the actor's eyes. The lack of glare and high efficiency of the projector, even when using an incandescent light, renders it peculiarly suitable for photography in operating rooms, where an arc light cannot be used, owing to the danger from the fine dust which it gives off.

Rows of projectors constitute the preferred form of illumination of large surfaces, but in some cases, it may be desirable to arrange the projectors in the form of a trough, with or without dividing side walls between the separate light sources. In some cases, these separating side walls may be omitted, where a small amount of light coming from the side of one filament, and passing through the prismatic plate of an adjacent light source, may be desirable in the production of multiple shadow effects.

The preferred form of the present invention, utilizing an incandescent lamp with a monoplane filament, necessitates, a substantially horizontal arrangement of the projector as the incandescent lamp will not operate satisfactorily when tipped much beyond 25° from the horizontal owing to sagging of the filament and to a blackening of the sides of the bulb. Where the bulb is upright, the blackening is at the top, and does no harm as the light passing through the top of the bulb is, for the most part, wasted anyhow, striking neither the reflector nor the prism. Where, however, the lamp is sufficiently tilted to cause blacking of the side a very serious decrease in efficiency may take place. In order to produce beams having an angle greater than about 25° with the horizontal various reflecting mirrors or prisms may be used in front of the prismatic lens. Other refracting prismatic plates may also be used, both to change the direction of the beam and, in some cases, to change its character where this is desirable. The present invention accordingly includes the use of other reflecting and refracting means to change the direction of the beam after it has left the projector.

Having thus described our invention, what we desire to secure by Letters Patent of the United States and claim is:

1. A projector comprising in combination a convergent projecting lens, a light source substantially on the optical axis of the lens, and a converging mirror behind the light source and coaxial with the lens, the light source being situated between the lens and its focus so that the direct radiation from the light source after passing through the convergent lens forms a divergent beam, and the mirror being so focused as to throw a beam on the lens, which, after passing therethrough converges at a steeper angle than the divergent beam from the direct radiation and after passing through a converging point or plane, diverges at a steeper angle than the divergent beam and coincides therewith in a plane at a finite distance from the lens, producing therein a field of substantially uniform illumination.

2. A projector comprising in combination a convergent prismatic plate, a light source substantially on the optical axis of the lens, and a converging mirror behind the light source and coaxial with the lens, the light source being situated between the lens and its focus so that the direct radiation from the light source after passing through the convergent lens forms a divergent beam, and the mirror being so focused as to throw a beam on the lens, which, after passing therethrough converges at a steeper angle than the divergent beam from the direct radiation and therefore after passing through a converging point or plane, diverges at a steeper angle than the divergent beam and coincides therewith in a plane at a finite distance from the lens, producing therein a field of substantially uniform illumination.

3. A projector comprising a convergent prismatic projecting lens having annular prisms, at least a majority of the prisms being of the same focal length, a light source substantially on the optical axis of the lens, and a converging mirror coaxial with the lens and behind the light source, the light source being situated between the lens and its focus, whereby the direct radiation of the light source striking the lens produces, after passing therethrough, a divergent beam, and the mirror being so adjusted that the beam reflected thereby after passing through the lens forms a convergent beam of steeper angle than the divergent beam from the direct radiation, whereby the convergent beam, after passing through a convergent point or plane, again diverges at a steeper angle than the divergent beam from the direct radiation and unites therewith in a plane at finite distance from the lens, producing therein a substantially uniform field of illumination.

4. A projector comprising a convergent prismatic projecting lens, a light source substantially on the optical axis of the lens and situated between the lens and its focus, a converging mirror behind the light source and substantially coaxial with the lens, the prismatic plate being provided with minor areas having refracting characteristics different from that of the majority of the plate, whereby the direct radiation of the light source after passing through the plate forms, for the most part, a divergent beam, the mirror being so adjusted as to project a beam which, after passing through the portions of the prismatic plate of uniform refracting characteristics, forms a beam converging at a steeper angle than the divergent beam from the direct radiation, whereby the convergent beam, after passing through a converging point or plane, diverges at a steeper angle than the divergent beam from the direct radiation, and unites therewith in a plane at a finite distance from the prismatic lens, the majority of illumination on said plane being substantially uniform, and minor portions of the plane being non-uniformly lighted by the light which passes through the portions of the plate of non-uniform refractive characteristics.

Signed at 57 East 56th St., New York city, N. Y., this 13th day of January, 1926.

GUSTAVUS T. KIRBY.
HARRY I. DAY.